Patented Oct. 21, 1941

2,259,844

UNITED STATES PATENT OFFICE 2,259,844

REFRACTORY MATERIAL

Frank Turow, Milwaukee, Wis., assignor to The Metro-Nite Company, Milwaukee, Wis., a corporation of Wisconsin No Drawing. Application June 15, 1939, Serial No. 279,279

3 Claims. (Cl. 106—61)

This invention relates to improvements in refractory materials.

It is a general object of the present invention to provide an improved refractory composition which can be applied in cementitious form to foundry furnaces, cupolas, and ladles and in other similar installations to form heat resistant linings.

At present there are on the market various compositions which are used as a refractory where heat resistant linings are required, as in furnaces and other devices in the foundry art. The available refractory compositions are, however, objectionable or faulty in a number of particulars. For instance, in the available refractory compositions organic matter is present and when the same becomes hot in usage, objectionable fumes and gases are given off which naturally has a deleterious effect on the contents of the furnace, cupola, or ladle.

It is, therefore, a primary object of the present invention to provide a refractory composition which has unusually high bonding and heat resisting qualities, and which when in usage gives stability without the formation of obnoxious fumes and gases, the latter being by virtue of the fact that the improved refractory composition is entirely free of organic matter.

A further object of the invention is to provide a refractory composition which when utilized as a lining for a foundry device, such as a molten metal ladle or container, will prevent the molten metal from penetrating the lining and entering the interstices of the walls of the container and causing sticking.

A further object of the invention is to provide a refractory composition which when utilized as a lining for a foundry device, such as a molten metal ladle or container, will assist in keeping the metal hot and will not give the metal an objectionable quick chill.

A further object of the invention is to provide a refractory composition which, when applied as a lining to a foundry furnace, ladle, or the like, can be applied with less thickness than is necessary with ordinary refractory materials whereby the container will have a materially greater capacity for molten metal.

A further object of the invention is to provide a refractory composition which, when in use as a lining, will have unusual heat resisting and refractory qualities and will furthermore be long lasting.

A further object of the invention is to provide a refractory composition which is composed essentially of fire clay and a special form of silicious dolomite.

A further object of the invention is to provide a refractory material which is relatively inexpensive, which may be easily compounded and applied as a lining material, which is strong and durable, and which is well adapted for the purposes set forth.

With the above and other objects in view, the invention consists of the improved refractory material, and its parts and ingredients as set forth in the claims, and all equivalents thereof.

Broadly stated, the present invention contemplates a mixture of several ingredients wherein unusual properties for the desired purpose are attributable to the mixed or combined relationship of the ingredients. The improved refractory material consists of equal parts by weight of a rare form of silicious dolomite and fire clay. The silicious dolomite and the fire clay are ground up and thoroughly mixed by suitable mechanical means.

A typical analysis of the rare form of silicious dolomite utilized is as follows:

| | Percent |
|---|---|
| Calcium magnesium carbonate | 65.7 |
| Calcium magnesium silicate | 34.2 |
| Moisture | .1 |

A break down of the calcium magnesium carbonate content will show, according to analysis, that it is composed of:

| | Percent |
|---|---|
| Acid soluble calcium as oxide (calcium carbonate) | 22.22 |
| Acid soluble magnesium as oxide (magnesium carbonate) | 14.10 |
| Carbon dioxide | 29.35 |

Similarly, the calcium magnesium silicate content, according to analysis is composed of:

| | Percent |
|---|---|
| Acid insoluble calcium as oxide (calcium silicate) | 6.70 |
| Acid insoluble magnesium as oxide (magnesium silicate) | 6.60 |
| Silica (free) | 20.90 |

An analysis of the fire clay utilized, which is typical, is as follows:

| | Percent |
|---|---|
| Ignition | 10.10 |
| Silica | 56.75 |
| Alumina | 26.37 |
| Iron oxide | 1.80 |
| Titania | 1.31 |
| Lime | .22 |
| Magnesia | .53 |
| Alkalies | 2.44 |

The silicious dolomite utilized is entirely devoid of organic matter and imparts to the finished refractory composition extremely high bonding and heat resisting qualities. The fire clay imparts extremely high refractory qualities to the finished product.

The improved refractory composition is in pulverulent form and when it is to be applied to a container, such as a foundry furnace, ladle or cupola, a suitable quantity of water is added to the desired amount of the refractory composition so as to make a more or less pasty or cementitious mass. The material in this form is then applied to the surface to be lined and ultimately the moisture content leaves the applied lining material so that the container is ultimately formed with a hard smooth lining of the refractory material, which lining may be of any desired thickness, but in practical usage the thickness of the same may be substantially less than that required when other forms of refractory linings are used and this is a decided advantage as it gives the container a maximum capacity.

The improved refractory composition is, of course, used in containers for the foundry art and is naturallly subjected to tremendous heat, it being customary for the container so lined to hold molten metal. Inasmuch as the improved refractory material is entirely devoid of organic matter, when it is subjected to the heat of the molten metal, no objectionable fumes or gases are given off. It has also been found that the metal in the container is prevented from penetrating and sticking to the walls of the container by virtue of the excellent and unusual properties of the refractory lining. The lining so formed is furthermore of such a nature that the metal in the container will stay hot an unusual length of time and will not subject the molten metal to a quick chill.

Although the improved refractory material has been described particularly as forming a lining for furnaces, cupolas, ladles, etc., in the foundry art, it is also adaptable as a refractory lining material for paper mill furnaces and other installations such as furnaces in drop forge plants which require a lining having high heat resisting qualities. It is also possible that the improved material may be used for insulating purposes and particularly for insulating portions of equipment which are subjected to high temperatures.

It should be understood that the invention is not to be limited except as set forth in the appended claims.

What is claimed as the invention is:

1. A refractory composition including in mixed relationship substantially equal parts of a rare form of dolomite, and pulverulent fire clay, said dolomite having a very high content of both silica and magnesia and a low lime content, the latter being neutralized by the silica and magnesium to prevent the formation of carbon dioxide gas.

2. A refractory composition including in mixed relationship substantially equal parts of silicious dolomite and fire clay, the siliceous dolomite including substantially 22% of calcium carbonate, 14% of magnesium carbonate, 6.7% of calcium silicate, 6.6% of magnesium silicate, and 20.9% of free silica.

3. A refractory composition including in mixed relationship substantially equal parts of siliceous dolomite and fire clay, the siliceous dolomite including substantially 22% of calcium carbonate, 14% of magnesium carbonate, 6.7% of calcium silicate, 6.6% of magnesium silicate, and 20.9% of free silica, the fire clay including substantially 56% of silica, 26% of alumina, 10% of ignition, and lesser amounts of iron oxide, titania, lime, magnesia, and alkalies.

FRANK TUROW.